(12) United States Patent
Schwarz

(10) Patent No.: US 10,371,047 B2
(45) Date of Patent: Aug. 6, 2019

(54) GEARED TURBOFAN ENGINE WITH TARGETED MODULAR EFFICIENCY

(71) Applicant: United Technologies Corporation, Hartford, CT (US)

(72) Inventor: Frederick M. Schwarz, Glastonbury, CT (US)

(73) Assignee: United Technologies Corporation, Farmington, CT (US)

( * ) Notice: Subject to any disclaimer, the term of this patent is extended or adjusted under 35 U.S.C. 154(b) by 676 days.

(21) Appl. No.: 14/651,923

(22) PCT Filed: Sep. 24, 2014

(86) PCT No.: PCT/US2014/057127
§ 371 (c)(1),
(2) Date: Jun. 12, 2015

(87) PCT Pub. No.: WO2015/088619
PCT Pub. Date: Jun. 18, 2015

(65) Prior Publication Data
US 2016/0265430 A1   Sep. 15, 2016

Related U.S. Application Data

(60) Provisional application No. 61/891,475, filed on Oct. 16, 2013.

(51) Int. Cl.
*F01D 5/14* (2006.01)
*F02C 3/107* (2006.01)

(52) U.S. Cl.
CPC ............. *F02C 3/107* (2013.01); *F01D 5/142* (2013.01); *F05D 2220/327* (2013.01);
(Continued)

(58) Field of Classification Search
CPC .......... F01D 5/142; F02C 3/107; Y02T 50/673
See application file for complete search history.

(56) References Cited

U.S. PATENT DOCUMENTS 2,258,792 A   4/1941   New
2,936,655 A   5/1960   Peterson et al.
(Continued)

FOREIGN PATENT DOCUMENTS

GB   2041090   9/1980
GB   2426792   12/2006

OTHER PUBLICATIONS

Kurzke, J. (2008). Lecture Series Mar. 2008. Aero-Engine Design: From State of the Art Turbofans Towards Innovative Architectures. pp. 1-76.*

(Continued)

*Primary Examiner* — Mary Davis
(74) *Attorney, Agent, or Firm* — Carlson, Gaskey & Olds, P.C.

(57) ABSTRACT

A turbofan engine includes a fan section including a fan blade having a leading edge and hub to tip ratio of less than about 0.34 and greater than about 0.020 measured at the leading edge and a speed change mechanism with gear ratio greater than about 2.6 to 1. A first compression section includes a last blade trailing edge radial tip length that is greater than about 67% of the radial tip length of a leading edge of a first stage of the first compression section. A second compression section includes a last blade trailing edge radial tip length that is greater than about 57% of a radial tip length of a leading edge of a first stage of the first compression section.

20 Claims, 1 Drawing Sheet

(52) U.S. Cl.
 CPC ... *F05D 2260/40311* (2013.01); *Y02T 50/671* (2013.01); *Y02T 50/673* (2013.01)

(56) References Cited

U.S. PATENT DOCUMENTS

| | | | |
|---|---|---|---|
| 3,021,731 A | 2/1962 | Stoeckicht |
| 3,352,178 A | 11/1967 | Lindgren et al. |
| 3,363,419 A | 1/1968 | Wilde |
| 3,754,484 A | 8/1973 | Roberts |
| 4,860,537 A | 8/1989 | Taylor |
| 4,966,338 A | 10/1990 | Gordon |
| 5,102,379 A | 4/1992 | Pagluica et al. |
| 5,136,839 A | 8/1992 | Armstrong |
| 5,174,525 A | 12/1992 | Schilling |
| 5,317,877 A | 6/1994 | Stuart |
| 5,433,674 A | 7/1995 | Sheridan et al. |
| 5,443,229 A | 8/1995 | O'Brien et al. |
| 5,452,575 A | 9/1995 | Freid |
| 5,466,198 A | 11/1995 | McKibbin et al. |
| 5,694,765 A | 12/1997 | Hield et al. |
| 6,223,616 B1 | 5/2001 | Sheridan |
| 7,021,042 B2 | 4/2006 | Law |
| 7,055,330 B2 | 6/2006 | Miller |
| 7,500,365 B2 | 3/2009 | Suciu et al. |
| 7,591,754 B2 | 9/2009 | Duong et al. |
| 7,824,305 B2 | 11/2010 | Duong et al. |
| 7,882,691 B2 | 2/2011 | Lemmers et al. |
| 7,926,260 B2 | 4/2011 | Sheridan et al. |
| 7,942,079 B2 | 5/2011 | Russ |
| 8,205,432 B2 | 6/2012 | Sheridan |
| 2003/0163983 A1 | 9/2003 | Seda et al. |
| 2006/0090448 A1 | 5/2006 | Henry |
| 2009/0053058 A1 | 2/2009 | Kohlenberg et al. |
| 2009/0056343 A1 | 3/2009 | Suciu et al. |
| 2009/0245997 A1 | 10/2009 | Hurwitz et al. |
| 2009/0314881 A1 | 12/2009 | Suciu et al. |
| 2010/0003121 A1 | 1/2010 | Berryann et al. |
| 2010/0218483 A1 | 9/2010 | Smith |
| 2010/0331139 A1 | 12/2010 | McCune |
| 2012/0124964 A1 | 5/2012 | Hasel et al. |
| 2012/0291449 A1 | 11/2012 | Adams et al. |
| 2013/0192198 A1 | 8/2013 | Brilliant et al. |
| 2013/0192258 A1 | 8/2013 | Kupratis et al. |

OTHER PUBLICATIONS

European Search Report for EP Application No. 14870182.4 dated May 26, 2017.
Brines, G.L. (1990). The turbofan of tomorrow. Mechanical Engineering: The Journal of the American Society of Mechanical Engineers, 108(8), 65-67.
Hess, C. (1998). Pratt & Whitney develops geared turbofan. Flug Revue 43(7). Oct. 1998.
Grady, J.E., Weir, D.S., Lamoureux, M.C., and Martinez, M.M. (2007). Engine noise research in NASA's quiet aircraft technology project. Papers from the International Symposium on Air Breathing Engines (ISABE). 2007.
Hall, C.A. and Crichton, D. (2007). Engine design studies for a silent aircraft. Journal of Turbomachinery, 129, 479-487.
Kerrebrock, J.L. (1977). Aircraft engines and gas turbines. Cambridge, MA: The MIT Press. p. 11.
Xie, M. (2008). Intelligent engine systems: Smart case system. NASA/CR-2008-215233. pp. 1-31.
Knip, Jr., G. (1987). Analysis of an advanced technology subsonic turbofan incorporating revolutionary materials. NASA Technical Memorandum. May 1987. pp. 1-23.
Willis, W.S. (1979). Quiet clean short-haul experimental engine (QCSEE) final report. NASA/CR-159473 pp. 1-289.
Oates, G.C. (Ed). (1989). Aircraft propulsion systems and technology and design. Washington, D.C.: American Institute of Aeronautics, Inc. pp. 341-344.

Lynwander, P. (1983). Gear drive systems: Design and application. New York, New York: Marcel Dekker, Inc. pp. 145, 355-358.
Sweetman, B. and Sutton, O. (1998). Pratt & Whitney's surprise leap. Interavia Business & Technology, 53.621, p. 25.
Mattingly, J.D. (1996). Elements of gas turbine propulsion. New York, New York: McGraw-Hill, Inc. pp. 8-15.
Wendus, B.E., Stark, D.F., Holler, R.P., and Funkhouser, M.E. (2003). Follow-on technology requirement study for advanced subsonic transport. NASA/CR-2003-212467. pp. 1-37.
Whitaker, R. (1982). ALF 502: plugging the turbofan gap. Flight International, p. 237-241, Jan. 30, 1982.
Hughes, C. (2010). Geared turbofan technology. NASA Environmentally Responsible Aviation Project. Green Aviation Summit. NASA Ames Research Center. Sep. 8-9, 2010. pp. 1-8.
Gliebe, P.R. And Janardan, B.A. (2003). Ultra-high bypass engine aeroacoustic study. NASA/CR-2003-21252. GE Aircraft Engines, Cincinnati, Ohio. Oct. 2003. pp. 1-103.
Moxon, J. How to save fuel in tomorrow's engines. Flight International. Jul. 30, 1983. 3873(124). pp. 272-273.
Cusick, M. (1981). Avco Lycoming's ALF 502 high bypass fan engine. Society of Automotive Engineers, inc. Business Aircraft Meeting & Exposition. Wichita, Kansas. Apr. 7-10, 1981 pp. 1-9.
Fledderjohn, K.R. (1983). The TFE731-5: Evolution of a decade of business jet service. SAE Technical Paper Series. Business Aircraft Meeting & Exposition. Wichita, Kansas. Apr. 12-15, 1983. pp. 1-12.
Dickey, T.A. and Dobak, E.R. (1972). The evolution and development status of ALF 502 turbofan engine. National Aerospace Engineering and Manufacturing Meeting. San Diego, California. Oct. 2-5, 1972. pp. 1-12.
Gunston, B. (Ed.) (2000). Jane's aero-engines, Issue seven. Coulsdon, Surrey, UK: Jane's Information Group Limited. pp. 510-512.
Ivchenko-Progress D-436. Jane's Aero-engines, Aero-engines—Turbofan. Feb. 8, 2012.
Ivchenko-Progress AI-727M. Jane's Aero-engines, Aero-engines—Turbofan. Nov. 27, 2011.
Ivchenko-Progress D-727. Jane's Aero-engines, Aero-engines—Turbofan. Feb. 7, 2007.
Turbomeca Aubisque. Jane's Aero-engines, Aero-engines—Turbofan. Nov. 2, 2009.
Aviadvigatel D-110. Jane's Aero-engines, Aero-engines—Turbofan. Jun. 1, 2010.
Rolls-Royce M45H. Jane's Aero-engines, Aero-engines—Turbofan. Feb. 24, 2010.
Honeywell LF502. Jane's Aero-engines, Aero-engines—Turbofan. Feb. 9, 2012.
Davies, D. and Miller, D.C. (1971). A variable pitch fan for an ultra quiet demonstrator engine. 1976 Spring Convention: Seeds for Success in Civil Aircraft Design in the Next Two Decades. pp. 1-18.
Middleton, P. (1971). 614: VFW's jet feederliner. Flight International, Nov. 4, 1971. p. 725, 729-732.
Schaefer, J.W., Sagerser, D.R., and Stakolich, E.G. (1977). Dynamics of high-bypass-engine thrust reversal using a variable-pitch fan. Technical Report prepare for NASA. NASA-TM-X-3524. May 1, 1977. pp. 1-33.
Savelle, S.A. And Garrard, G.D. (1996). Application of transient and dynamic simulations to the U.S. Army T55-L-712 helicopter engine. The American Society of Mechanical Engineers. Presented Jun. 10-13, 1996. pp. 1-8.
Anderson, N.E., Loewenthal, S.H., and Black, J.D. (1984). An analytical method to predict efficiency of aircraft gearboxes. NASA Technical Memorandum prepared for the Twentieth Joint Propulsion Conference. Cincinnati, OH. Jun. 11-13, 1984. pp. 1-25.
Edkins, D.P., Hirschkron, R., and Lee, R. (1972). TF34 turbofan quiet engine study. Final Report prepared for NASA. NASA-CR-120914. Jan. 1, 1972. pp. 1-99.
Waters, M.H. and Schairer, E.T. (1977). Analysis of turbofan propulsion system weight and dimensions. NASA Technical Memorandum. Jan. 1977. pp. 1-65.
Meyer, A.G. (1988). Transmission development of TEXTRON Lycoming's geared fan engine. Technical Paper. Oct. 1988. pp. 1-12.
Dudley, D.W., Ed. (1962). Gear handbook. New York, NY: McGraw-Hill. pp. 14-17 (TOC, Preface, and Index).

(56) References Cited

OTHER PUBLICATIONS

Hughes, C. (2002). Aerodynamic performance of scale-model turbofan outlet guide vanes designed for low noise. Prepared for the 40th Aerospace Sciences Meeting and Exhibit. Reno, NV. NASA/TM-2001-211352. Jan. 14-17, 2002. pp. 1-38.
Kaplan, B., Nicke, E., Voss, C. (2006), Design of a highly efficient low-noise fan for ultra-high bypass engines. Proceedings of GT2006 for ASME Turbo Expo 2006: Power for Land, Sea and Air. Barcelona, SP. May 8-11, 2006. pp. 1-10.
U.S. Appl. No. 11/832,107, dated Aug. 1, 2007, Engine Mounting Configuration for a Turbofan Gas Turbine Engine.
Article—"Gears Put a New Spin on Turbofan Performance," printed from MachineDesign.com website. Nov. 1998.
Article—"Gas Power Cycle—Jet Propulsion Technology, a Case Study," from MachineDesign.com website.
Jane's Aero-Engines, Issue Seven, Copyright 2000, pp. 510-512.
Hill et al., "Mechanics and Thermodynamics of Propulsion" pp. 307-308.
Kandebo, "Geared-Turbofan Engine Design Targets Cost, Complexity", Aviation Week & Space Technology, New York, Feb. 23, 1998.
Zalud, "Gears put a new spin on turbofan performance" Machine Design; Nov. 5, 1998, vol. 70 Issue 20.
International Search Report and Written Opinion for PCT Application No. PCT/US2012/072271 dated Mar. 8, 2013.
International Search Report and Written Opinion for International Application No. PCT/US2014/57127 dated Jun. 10, 2015.
Honeywell TFE731. Jane's Aero-engines, Aero-engines—Turbofan. Jul. 18, 2012.
NASA Conference Publication. Quiet, powered-lift propulsion. Cleveland, Ohio. Nov. 14-15, 1978. pp. 1-420.
"Civil Turbojet/Turbofan Specifications", Jet Engine Specification Database (Apr. 3, 2005).
Kandebo, S.W. (1993). Geared-turbofan engine design targets cost, complexity. Aviation Week & Space Technology, 148(8). Start p. 32.
Hendricks, E.S. and Tong, M.T. (2012). Performance and weight estimates for an advanced open rotor engine. NASA/TM-2012-217710. pp. 1-13.
Guynn, M. D., Berton, J.J., Fisher, K. L., Haller, W.J., Tong, M. T., and Thurman, D.R. (2011). Refined exploration of turbofan design options for an advanced single-aisle transport. NASA/TM-2011-216883. pp. 1-27.
Zalud, T. (1998). Gears put a new spin on turbofan performance. Machine Design, 70(20), p. 104.
Kurzke, J. (2008). Preliminary Design, Aero-engine design: From state of the art turbofans towards innovative architectures. pp. 1-72.
Zamboni, G. and Xu, L. (2009). Fan root aerodynamics for large bypass gas turbine engines: Influence on the engine performance and 3D design. Proceedings of ASME Turbo Expo 2009: Power for Land, Sea and Air. Jun. 8-12, 2009, Orlando, Florida, USA. pp. 1-12.
Mattingly, J.D. (1996). Elements of gas turbine propulsion. New York, New York: McGraw-Hill, Inc. pp. 1-18, 60-62, 85-87, 95-104, 121-123, 223-234, 242-245, 278-280, 303-309, 323-326, 462-479, 517-520, 563-565, 673-675, 682-685, 697-699, 703-705, 802-805, 862-864, and 923-925.
Declaration of Reza Abhari, Ph.D. In re U.S. Appl. No. 8,844,265. Executed Jun. 28, 2016. pp. 1-91.
Declaration of John Eaton, Ph.D. In re U.S. Appl. No. 8,689,568. Executed Mar. 28, 2016. pp. 1-87.
Declaration of Reza Abhari. In re U.S. Appl. No. 8,695,920. Executed Nov. 30. pp. 1-67.
Declaration of Reza Abhari. In re U.S. Appl. No. 8,448,895. Executed Nov. 28. pp. 1-81.
Declaration of Reza Abhari. In re U.S. Appl. No. 8,695,920, claims 1-4, 7-14, 17 and 19. Executed Nov. 29. pp. 1-102.
Declaration of Dr. Magdy Attia. In re U.S. Appl. No. 8,313,280. Executed Oct. 21, 2016. pp. 1-88.
Lord, W.K., MacMartin, D.G., and Tillman, T.G. (2000). Flow control opportunities in gas turbine engines. American Institute of Aeronautics and Astronautics. pp. 1-15.
Daly, M. Ed. (2010). Jane's Aero-Engine. Issue Twenty-seven. Mar. 2010. p. 633-636.
Roux, E. (2007). Turbofan and turbojet engines database handbook. Editions Elodie Roux. Blagnac: France. pp. 1-595.
Wilfert, G. (2008). Geared fan. Aero-Engine Design: From State of the Art Turbofans Towards Innovative Architectures, von Karman Institute for Fluid Dynamics, Belgium, Mar. 3-7, 2008. pp. 1-26.
Declaration of Dr. Magdy Attia. In re U.S. Appl. No. 8,517,668. Executed Dec. 8, 2016 pp. 1-81.
Norton, M. and Karczub, D. (2003). Fundamentals of noise and vibration analysis for engineers. Press Syndicate of the University of Cambridge. New York: New York. p. 524
El-Sayad, A.F. (2008). Aircraft propulsion and gas turbine engines. Boca Raton, FL: CRC Press. pp. 215-219 and 855-860.
International Preliminary Report on Patentability for International Application No. PCT/US2014/057127 dated Apr. 28, 2016.

\* cited by examiner

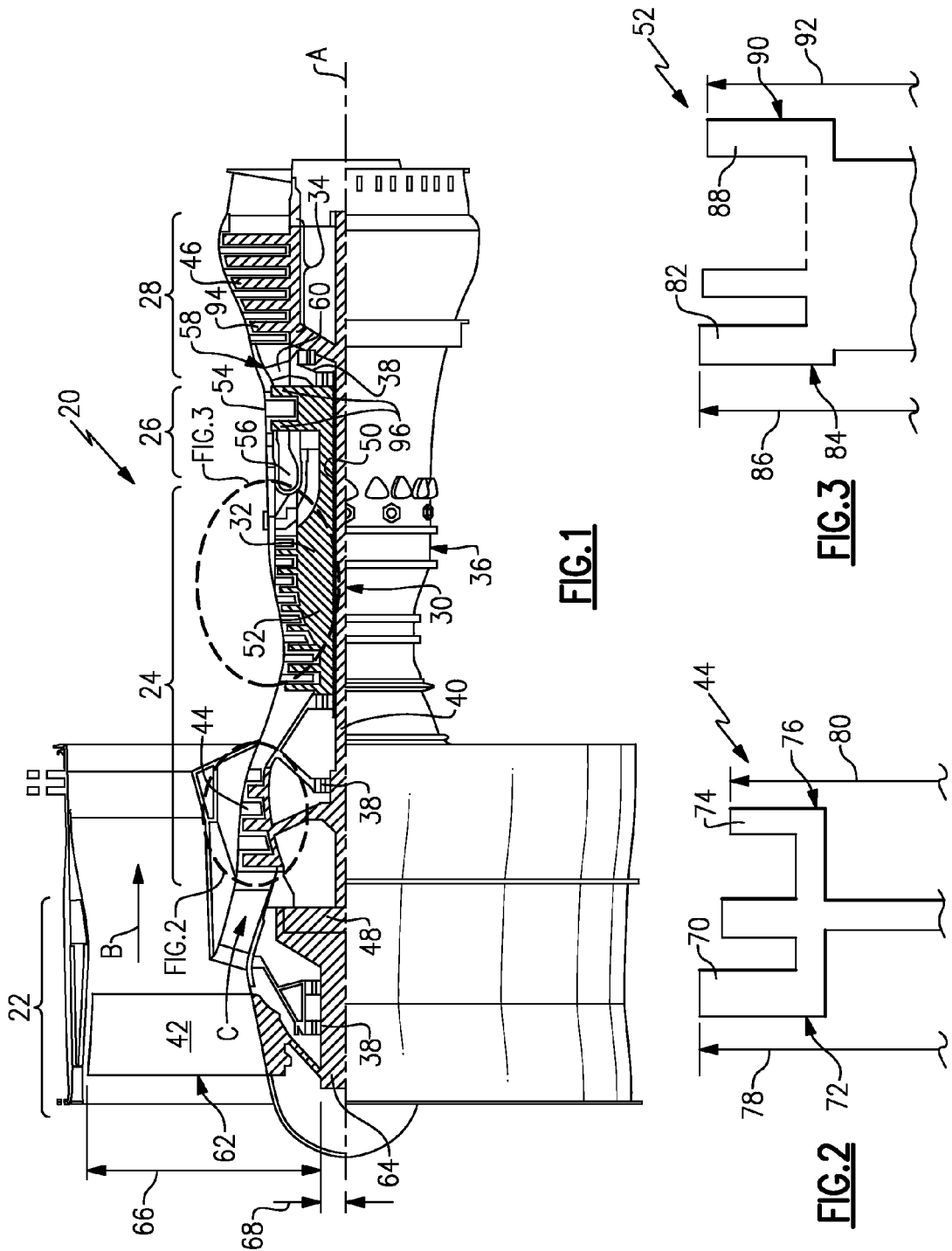

GEARED TURBOFAN ENGINE WITH TARGETED MODULAR EFFICIENCY

CROSS-REFERENCE TO RELATED APPLICATION

This application claims priority to U.S. Provisional Application No. 61/891,475 filed on Oct. 16, 2013.

BACKGROUND

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

The high pressure turbine drives the high pressure compressor through an outer shaft to form a high spool, and the low pressure turbine drives the low pressure compressor through an inner shaft to form a low spool. The fan section may also be driven by the low inner shaft. A direct drive gas turbine engine includes a fan section driven by the low spool such that the low pressure compressor, low pressure turbine and fan section rotate at a common speed in a common direction.

A speed reduction device such as an epicyclical gear assembly may be utilized to drive the fan section such that the fan section may rotate at a speed different than the turbine section so as to increase the overall propulsive efficiency of the engine by allowing an increase in the fan diameter and a reduction in a fan pressure rise. In such engine architectures, a shaft driven by one of the turbine sections provides an input to the epicyclical gear assembly that drives the fan section at a reduced speed such that both the turbine section and the fan section can rotate at closer to their individual optimal speeds.

Although geared architectures have improved propulsive efficiency, turbine engine manufacturers continue to seek further improvements to engine performance including improvements to thermal, transfer and propulsive efficiencies.

SUMMARY

A turbofan engine according to an exemplary embodiment of this disclosure, among other possible things includes a fan section including a fan blade having a leading edge and hub to tip ratio of less than about 0.34 and greater than about 0.020 measured at the leading edge and a speed change mechanism with gear ratio greater than about 2.6 to 1. A first compression section includes a last blade trailing edge radial tip length that is greater than about 67% of the radial tip length of a leading edge of a first stage of the first compression section. A second compression section includes a last blade trailing edge radial tip length that is greater than about 57% of a radial tip length of a leading edge of a first stage of the first compression section.

In a further embodiment of the foregoing turbofan engine, the fan section provides a low fan pressure ratio less than about 1.6.

In a further embodiment of any of the foregoing turbofan engines, the fan section provides a low fan pressure ratio between about 1.45 and about 1.20.

In a further embodiment of any of the foregoing turbofan engines, the fan section provides a bypass ratio greater than about 8.

In a further embodiment of any of the foregoing turbofan engines, the fan section provides a bypass ratio greater than about 8.

In a further embodiment of any of the foregoing turbofan engines, the fan section provides a bypass ratio greater than about 12.

In a further embodiment of any of the foregoing turbofan engines, includes a turbine section that has a fan drive turbine and at least two turbine stages forward of a first turbine blade of the fan drive turbine.

In a further embodiment of any of the foregoing turbofan engines, the fan drive turbine includes at least three stages.

In a further embodiment of any of the foregoing turbofan engines, the fan drive turbine is coupled to the drive the first compression section.

In a further embodiment of any of the foregoing turbofan engines, at least one of the at least two turbine stages is coupled to drive the second compression section.

In a further embodiment of any of the foregoing turbofan engines, the at least two stages include a single turbine second forward of the fan drive turbine.

In a further embodiment of any of the foregoing turbofan engines, the first compression section includes three stages and the second compression section includes eight stages.

A turbofan engine according to an exemplary embodiment of this disclosure, among other possible things includes a fan section providing a bypass ratio greater than about 12, and a speed change mechanism with gear ratio greater than about 2.6 to 1. A first compression section includes a last blade trailing edge tip length that is greater than 67% of the radial length of a first stage leading edge of the first compression section. A second compression section includes a last blade with a trailing edge tip that includes a radial length that is greater than 57% of a radial length of the first stage leading edge of the first compression section.

In a further embodiment of any of the foregoing turbofan engines, the fan section includes a plurality of fan blades supported on a hub. A leading edge of at least one of the fan blades includes a leading edge and a hub to tip ratio is less than about 0.34 and greater than about 0.020 measured at the leading edge.

In a further embodiment of any of the foregoing turbofan engines, includes a turbine section that has a fan drive turbine and at least two turbine stages forward of a first turbine blade of the fan drive turbine.

In a further embodiment of any of the foregoing turbofan engines, at least one of the at least two turbine stages is coupled to drive the second compression section.

In a further embodiment of any of the foregoing turbofan engines, the at least two stages include a single turbine section forward of the fan drive turbine.

In a further embodiment of any of the foregoing turbofan engines, the fan section provides a fan pressure ratio between about 1.45 and about 1.20.

In a further embodiment of any of the foregoing turbofan engines, the first compression section includes three stages and the second compression section includes eight stages.

Although the different examples have the specific components shown in the illustrations, embodiments of this disclosure are not limited to those particular combinations. It is possible to use some of the components or features from

BRIEF DESCRIPTION OF THE DRAWINGS

FIG. 1 is a schematic view of an example turbine engine according to an embodiment.

FIG. 2 is a schematic view of a compressor section of the example turbine engine according to an embodiment.

FIG. 3 is a schematic view of another compressor section of the example turbine engine according to an embodiment.

DETAILED DESCRIPTION

FIG. 1 schematically illustrates an example gas turbine engine 20 that includes a fan section 22, a compressor section 24, a combustor section 26 and a turbine section 28. Alternative engines might include an augmenter section (not shown) among other systems or features. The fan section 22 drives air along a bypass flow path B while the compressor section 24 draws air in along a core flow path C where air is compressed and communicated to a combustor section 26. In the combustor section 26, air is mixed with fuel and ignited to generate a high pressure exhaust gas stream that expands through the turbine section 28 where energy is extracted and utilized to drive the fan section 22 and the compressor section 24.

Although the disclosed non-limiting embodiment depicts a turbofan gas turbine engine, it should be understood that the concepts described herein are not limited to use with turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that connects the fan section 22 and a low pressure (or first) compressor section 44 to a low pressure (or first) turbine section 46. The inner shaft 40 drives the fan section 22 through a speed change device, such as a geared architecture 48, to drive the fan section 22 at a lower speed than the low speed spool 30. The high-speed spool 32 includes an outer shaft 50 that interconnects a high pressure (or second) compressor section 52 and a high pressure (or second) turbine section 54. The inner shaft 40 and the outer shaft 50 are concentric and rotate via the bearing systems 38 about the engine central longitudinal axis A.

A combustor 56 is arranged between the high pressure compressor 52 and the high pressure turbine 54. In one example, the high pressure turbine 54 includes at least two stages to provide a double stage high pressure turbine 54. As used herein, a "high pressure" compressor or turbine experiences a higher pressure than a corresponding "low pressure" compressor or turbine.

The example low pressure turbine 46 has a pressure ratio that is greater than about 5. The pressure ratio of the example low pressure turbine 46 is measured prior to an inlet of the low pressure turbine 46 as related to the pressure measured at the outlet of the low pressure turbine 46 prior to an exhaust nozzle. The low pressure turbine 46 is coupled to the fan section 22 through the geared architecture 48 and therefore is also referred to interchangeably in this disclosure as the fan drive turbine 46.

A mid-turbine frame 58 of the engine static structure 36 is arranged generally between the high pressure turbine 54 and the low pressure turbine 46. The mid-turbine frame 58 further supports bearing systems 38 in the turbine section 28 as well as setting airflow entering the fan drive turbine 46.

Airflow through the core airflow path C is compressed by the low pressure compressor 44 then by the high pressure compressor 52 mixed with fuel and ignited in the combustor 56 to produce high speed exhaust gases that are then expanded through the high pressure turbine 54 and fan drive turbine 46. The mid-turbine frame 58 includes vanes 60, which are in the core airflow path and function as an inlet guide vane for the low pressure turbine 46. Utilizing the vane 60 of the mid-turbine frame 58 as the inlet guide vane for low pressure turbine 46 decreases the length of the low pressure turbine 46 without increasing the axial length of the mid-turbine frame 58. Choosing a high gearbox input to output ratio, reduces the number of vane rows in the fan drive turbine 46 and shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about eight (8), with an example embodiment being greater than about twelve (12). The geared architecture 48 is an epicyclical gear train, such as a planetary gear system, star gear system or other known gear system, with a gear reduction ratio of greater than about 2.6.

In one disclosed embodiment, the gas turbine engine 20 includes a bypass ratio greater than about twelve (12:1) and a diameter of the fan blades 42 is significantly larger than an outer diameter of the low pressure compressor 44. It should be understood, however, that the above parameters are only exemplary of one embodiment of a gas turbine engine including a geared architecture and that the present disclosure is applicable to other gas turbine engines.

A significant amount of thrust is provided by flow through the bypass flow path B due to the high bypass ratio. The fan section 22 of the engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment the low fan pressure ratio is between 1.45 and 1.20.

"Low corrected fan tip speed" is the actual fan tip speed in ft/sec divided by an industry standard temperature correction of $[(\text{Tram} \, ^\circ \text{R})/(518.7^\circ \text{R})]^{0.5}$. The "Low corrected fan tip speed", as disclosed herein according to one non-limiting embodiment, is less than about 1150 ft/second.

The example gas turbine engine includes the fan section 22 that comprises in one non-limiting embodiment less than about 26 fan blades 42. In another non-limiting embodiment, the fan section 22 includes less than about 20 fan blades 42. Moreover, in one disclosed embodiment the low pressure turbine 46 includes no more than about 6 turbine rotor stages schematically indicated at 34. In another non-limiting example embodiment the low pressure turbine 46 includes about 3 turbine rotor states. A ratio between the number of fan blades 42 and the number of low pressure turbine rotors is between about 3.3 and about 8.6. The example low pressure turbine 46 provides the driving power to rotate the fan section 22 and therefore the relationship between the number of turbine rotor stages 34 in the low pressure turbine 46 and the number of blades 42 in the fan section 22 disclose an example gas turbine engine 20 with increased power transfer efficiency.

An example disclosed engine 20 provides a system-level combination of component (module) efficiencies and a system-level combination of features within these modules that are used to arrive at uniquely high engine efficiency (i.e. Thrust Specific Fuel Consumption) at takeoff and at bucket cruise. The disclosed combination of components provide benefit in a commercial engine with very high bypass ratio in achieving the stated, very low, thrust specific fuel consumption (see table 1) and is especially beneficial to a single aisle aircraft where the overall pressure ratio of the compressor is less than 50.

with a higher hub to tip ratio. In one example embodiment the fan section 22 further provides a low fan pressure ratio that is between about 1.45 and about 1.20, and a bypass ratio greater than about 8.0.

The disclosed engine 20 includes the geared architecture 48 with a gear ratio greater than about 2.6 to 1. In this example the speed change system is the geared architecture, which is an epicyclical gearbox and which includes planet gears or star gears interspersed by baffles for gathering and directing lubricant during operation.

The example turbine section 28 has at least two turbine stages forward of the first turbine stage 94 included in the fan drive turbine 46. In this example, the high pressure or second turbine includes two turbine stages 96 forward of the fan drive turbine 46. In this example, the two turbine stages 96 are part of a single high pressure turbine 54 with at least two turbine rotors 96, however, it is within the contemplation of this disclosure that the at least two turbine rotors forward of the fan drive turbine 46 could be part of multiple turbines that rotate independent of each other, for example, two separate turbine sections with at least one turbine rotor each.

Referring to FIG. 2, with continued reference to FIG. 1, the first compression section 44, which in one disclosed example is a low pressure compressor (LPC) 44, includes three stages. The example LPC 44 includes first compressor blade 70 with a leading edge 72 and a last compressor blade 74 with trailing edge 76. A tip of the leading edge 72 of the first blade 70 extends a radial distance 78 from the engine axis A. A tip of the trailing edge 76 of the last blade 74 extends a radial distance 80 from the engine axis A. The first

TABLE 1

|  | Sea level takeoff, 86 deg F., 0.0 Mn: Test Stand Operation: no power extraction, no Environmental Control System bleed | [2]Sea level takeoff, 86 deg F., 0.0 Mn: Test Stand Operation: no power extraction, no Environmental Control System bleed | Bucket Cruise, 0.8Mn, 35,000 ft, Standard Day |
|---|---|---|---|
| Thrust Specific Fuel Consumption [1] |  | 0.2751 | 0.53717 |
| Speed change (Input/output) | At least | 2.6 | 2.6 |
| Component efficiency |  |  |  |
| Fan OD | at least 0.90 | 0.9344 | 0.96501 |
| Speed Change Mechanism | at least 0.985 | 0.9949 | 0.99374 |
| First Compressor or LPC | at least 0.84 | 0.8695 | 0.86622 |
| Second Compressor or HPC | at least 0.82 | 0.8495 | 0.8356 |
| Turbine Section(s) excluding the fan drive turbine | at least 0.85 for the single HPT or combined efficiency if two or more turbines are used | 0.87544 | 0.8938 |
| Fan Drive turbine | at least 0.89 | 0.9251 | 0.9266 |

The combination of module efficiency includes among other possible things, the fan section 22 with the fan blades 42 supported on a fan hub 64. Each of the fan blades 42 includes a leading edge 62 that extends a radial distance 66 from the engine axis A. The fan hub 64 extends a radial distance 68 from the engine axis A. A low hub-tip ratio of fan hub radial radius 68 to the radius at the leading edge 62 of the fan blade 42 is less than 0.34 and greater than 0.020. The disclosed range of ratios is desirable in that the lower this value is, the smaller the outer fan section and inlet section has to be to accommodate a given amount of air, and maintaining this dimension within the desired ratio range enables a reduction in engine weight relative to an engine compression section 44 is configured such that a ratio between the radial distance 80 at the trailing edge 76 is greater than 67% of the radial distance 78 of the leading edge 72 of the first blade 70. The example configuration provided by the disclosed ratio enables improved airflow through the first compressor section 44 that provides improved efficiency. The disclosed relationship between the leading edge 72 and the trailing edge 76 enables a beneficial modest slope to the engine casing structures spanning the compressor section 24. The modes slope provides for minimal effects to tip clearances of the compressor blades due to axial shifting of the compressor rotor due to overall aerodynamic loading.

Referring to FIG. 3 with continued reference to FIG. 1, the second compression section 52, which in one disclosed example is a high pressure compressor (HPC), includes at least eight stages. The example HPC 52 includes a first blade 82 with a leading edge 84 that extends a radial distance 86 from the engine axis A to a tip. The second compressor section 52 also includes a last blade 88 having a trailing edge 90 that extends a radial distance 92 from the engine axis A to the tip. A ratio between the leading edge 84 and the trailing edge 90 defines the configuration of the compressor 52 that provides the improved efficiency. In one disclosed example, the radial distance 92 of the trailing edge 90 of the last blade 88 is greater than about 57% of the radial distance 86 of the leading edge 84 of the first blade 82 of the second compressor section 52.

A geared turbofan arrangement for short range aircraft can uniquely exploit the particular aspects of an aircraft duty cycle that is characterized by an unusually low proportion of time in cruise operation versus the total time spent at takeoff and climb power (for a representative time span such as between engine overhauls).

A definition of a short range aircraft is one with a total flight length less than about 300 nautical miles.

TABLE 2

| Engine | #1 | #2 |
|---|---|---|
| Max takeoff weight | 53,060 kg (117,000 lb) | 58,967 kg (130,000 lb) |
| Max landing weight | 49,895 kg (110,000 lb) | 55,111 kg (121,500 lb) |
| Maximum cargo payload | 3,629 kg (8,000 lb) | 4,853 kg (10,700 lb) |
| Maximum payload (total) | 13,676 kg (30,150 lb) | 16,284 kg (35,900 lb) |
| Max range | 2,778 km (1,500 nmi) | 2,778 km (1,500 nmi) |
| Take off run at MTOW | 1,219 m (3,999 ft) | 1,524 m (5,000 ft) |
| Landing field length at MLW | 1,341 m (4,400 ft) | 1,448 m (4,751 ft) |

As is shown in Table 2, a short range aircraft for purposes of this disclosure is defined as including a single aisle configuration with 2, 3 seating or 3, 3 seating. Conventionally, a short range aircraft have a capacity of about 200 passengers or less. Moreover, an example short range aircraft will have a maximum range of only about 1500 nautical miles.

Because of the extremely high utilization in terms of cumulative hours at relatively high power during take-off conditions, the disclosed geared turbofan engine 20 arrangement is configured differently to achieve a beneficial balance of fuel burn and maintenance costs. The high power utilization is a result of frequent operation at high power conditions that generate high turbine temperatures, elevated turbine cooling air temperatures and elevated temperatures at the rear stage of the compressor. The result of such operation is that LPC pressures rise, temperature rise and efficiency may be lower than for a long range aircraft. In a long range aircraft that operates for longer periods and a greater portion of the cumulative operating hours, maximizing LPC efficiency is desired provides a significant benefit, and is a key difference when compared to short range aircraft. Pressure and temperature rise can be increased due to the less frequent use of takeoff power between overhaul periods which could be around 4000 hours for both the short range and long range commercial airliner.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A turbofan engine comprising;
a fan section including a fan blade having a leading edge and hub to tip ratio of less than 0.34 and greater than 0.020 measured at the leading edge;
a speed change mechanism with gear ratio greater than 2.6:1;
a first compression section including a last blade trailing edge radial tip length that is greater than 67% of the radial tip length of a leading edge of a first stage of the first compression section;
a second compression section including a last blade trailing edge radial tip length that is greater than 57% of a radial tip length of a leading edge of a first stage of the first compression section; and
a turbine section including a fan drive turbine section and a second turbine section forward of the fan drive turbine section, wherein a mid-turbine frame is arranged between the fan drive turbine section and the second turbine section, the mid-turbine frame supporting a bearing system that supports rotation of at least one of the fan drive turbine and the second turbine section and includes a vane guiding core flow into the fan drive turbine section.

2. The turbofan engine as recited in claim 1, wherein the fan section provides a low fan pressure ratio less than 1.6 across a fan blade alone.

3. The turbofan engine as recited in claim 2, wherein the fan section provides a low fan pressure ratio between 1.45 and 1.20 across a fan blade alone.

4. The turbofan engine as recited in claim 3, wherein the fan section provides a bypass ratio greater than 8.

5. The turbofan engine as recited in claim 3, wherein the fan section provides a bypass ratio greater than 12.

6. The turbofan engine as recited in claim 1, wherein the fan section provides a bypass ratio greater than 8.

7. The turbofan engine as recited in claim 1, wherein the second turbine section includes at least two turbine stages forward of a first turbine blade of the fan drive turbine.

8. The turbofan engine as recited in claim 7, wherein the fan drive turbine includes at least three stages.

9. The turbofan engine as recited in claim 8, wherein the fan drive turbine is coupled to the drive the first compression section.

10. The turbofan engine as recited in claim 9, wherein at least one of the at least two turbine stages is coupled to drive the second compression section.

11. The turbofan engine as recited in claim 1, wherein the first compression section includes three stages and the second compression section includes eight stages.

12. The turbofan engine as recited in claim 1, wherein the fan includes a plurality of fan blades and the fan drive turbine includes a plurality of rotor stages and a ratio between the number of the plurality of fan blades and the number of the plurality of rotor stages is between 3.3 and 8.6.

13. The turbofan engine as recited in claim 12, wherein the plurality of fan blades is less than 20 fan blades.

14. A turbofan engine comprising:
a fan section providing a bypass ratio greater than 12;
a speed change mechanism with gear ratio greater than 2.6 to 1;

a first compression section including a last blade trailing edge tip length that is greater than 67% of the radial length of a first stage leading edge of the first compression section; and a second compression section including a last blade with a trailing edge tip that includes a radial length that is greater than 57% of a radial length of the first stage leading edge of the first compression section; and a turbine section including a fan drive turbine section and a second turbine section forward of the fan drive turbine section, wherein a mid-turbine frame is arranged between the fan drive turbine section and the second turbine section, the mid-turbine frame supporting a bearing system that supports rotation of at least one of the fan drive turbine and the second turbine section and includes a vane guiding core flow into the fan drive turbine section.

15. The turbofan engine as recited in claim 14, wherein the fan section includes a plurality of fan blades supported on a hub, wherein a leading edge of at least one of the fan blades includes a leading edge and a hub to tip ratio is less than 0.34 and greater than 0.020 measured at the leading edge.

16. The turbofan engine as recited in claim 15, wherein the fan section provides a fan pressure ratio between 1.45 and 1.20 across the plurality of fan blades alone.

17. The turbofan engine as recited in claim 14, wherein the second turbine section includes at least two turbine stages forward of a first turbine blade of the fan drive turbine.

18. The turbofan engine as recited in claim 17, wherein at least one of the at least two turbine stages is coupled to drive the second compression section.

19. The turbofan engine as recited in claim 14, wherein the first compression section includes three stages and the second compression section includes eight stages.

20. The turbofan engine as recited in claim 14, wherein the fan includes a plurality of fan blades and the fan drive turbine includes a plurality of rotor stages and a ratio between the number of the plurality of fan blades and the number of the plurality of rotor stages is between 3.3 and 8.6.

* * * * *

UNITED STATES PATENT AND TRADEMARK OFFICE
CERTIFICATE OF CORRECTION

PATENT NO. : 10,371,047 B2  
APPLICATION NO. : 14/651923  
DATED : August 6, 2019  
INVENTOR(S) : Frederick M. Schwarz Page 1 of 1

It is certified that error appears in the above-identified patent and that said Letters Patent is hereby corrected as shown below:

In the Claims

Claim 1 Column 8 Line 14: "of the first compression section; and..."  
Replace "first" with –second–

Claim 9 Column 8 Line 42: "fan drive turbine is coupled to the drive the first compression..."  
Omit the underlined "the"

Claim 14 Column 9 Line 8: "leading edge of the first compression section; and..,"  
Replace "first" with –second–

Signed and Sealed this  
Fifth Day of November, 2019

Andrei Iancu  
*Director of the United States Patent and Trademark Office*